Oct. 14, 1947.                H. E. LAWSON                2,428,850
          DEFERRED-ACTION DRY CELL WITH MAGNESIUM ELECTRODE
                        Filed Dec. 26, 1941
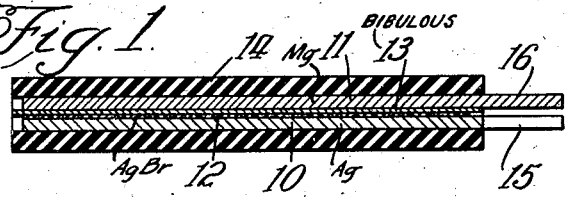
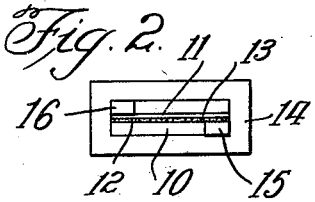
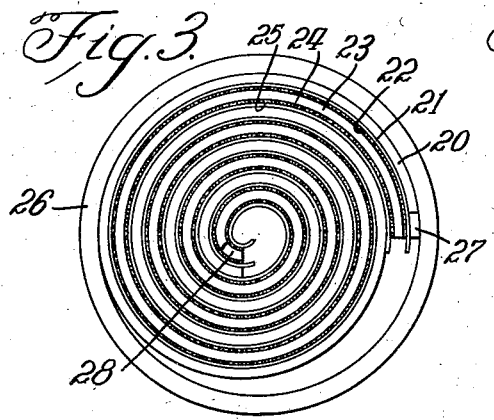
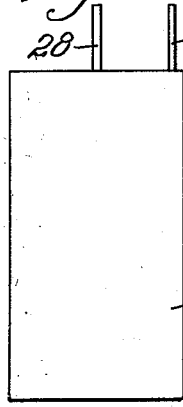
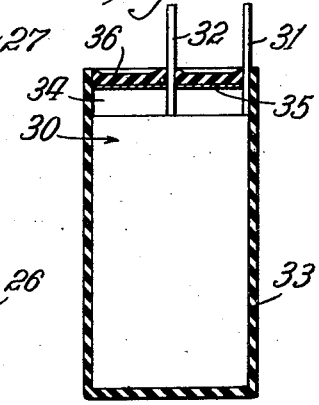
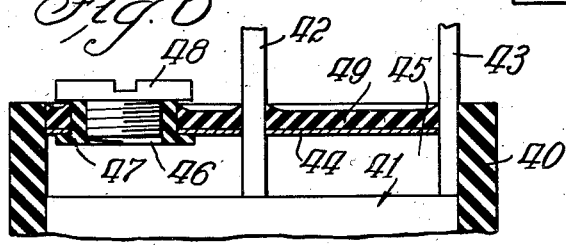
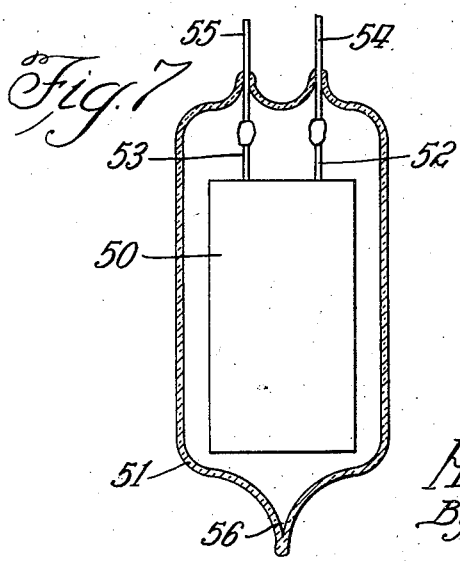
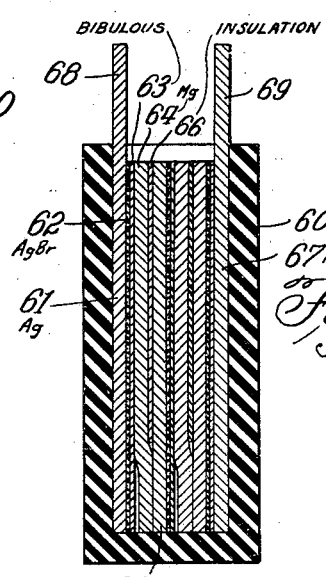
Inventor:
Herbert E. Lawson
By:- Jesch and Darbo  Atty.

Patented Oct. 14, 1947

2,428,850

UNITED STATES PATENT OFFICE 2,428,850

DEFERRED ACTION DRY CELL WITH MAGNESIUM ELECTRODE

Herbert E. Lawson, Elgin, Ill., assignor, by mesne assignments, to Burgess Battery Company, Freeport, Ill., a corporation of Delaware Application December 26, 1941, Serial No. 424,419

22 Claims. (Cl. 136—90)

This invention relates to primary electric cells of the type designated as dry cells, and is directed to the arrangement and composition of the cell elements so as to provide a dry cell which has low internal resistance and is capable of delivering large current for its size, and which undergoes little or no deterioration during the period of storage prior to its being placed in operation.

Briefly, the invention consists in a dry cell having thin, sheet-form cell elements, whereby the anode and cathode are in close proximity to each other, and in which electrolyte compounds are not added when the cell is manufactured but are generated as a result of the electrolytic action which takes place when the cell is placed in operation.

A specific example of the invention is a dry cell having a magnesium anode, a silver cathode having a thin coating of silver bromide electrolytically deposited on the surface thereof disposed toward the anode, the anode and cathode being separated by a thin sheet of absorbent paper. The cell may be moistened with water which is substantially free of dissolved ionically conductive salts, or it may be dry and such water may be added at any time prior to the placing of the cell in use.

In the drawings:

Fig. 1 is a longitudinal sectional view of a dry cell in accordance with this invention;

Fig. 2 is a plan view of the dry cell of Fig. 1;

Fig. 3 is a plan view of a different form of the dry cell;

Fig. 4 is an elevational view of the dry cell of Fig. 3;

Fig. 5 is a vertical sectional view of a different form of the invention;

Fig. 6 is a fragmental vertical sectional view, on an enlarged scale, of a further modification of the dry cell;

Fig. 7 is a vertical sectional view of a further modification of the invention; and Fig. 8 is a vertical sectional view of a multiple cell battery in accordance with the invention.

In the construction shown in Figs. 1 and 2 the dry cell consists of a silver cathode 10 and a magnesium anode 11. The silver cathode has a coating of silver bromide 12 on the surface thereof disposed toward the anode. A separating member 13 is disposed between the anode 11 and the silver bromide coating 12, this separating member being composed of a bibulous, non-conducting material, such as porous paper, regenerated cellulose film, or woven cloth of cotton, rayon, glass or the copolymerized resin composed of vinyl chloride and vinyl acetate, which is marketed under the trade-mark "Vinyon." All of the said cell elements are in the form of thin sheets or plates. In the drawings the thickness of the elements is enlarged for the purpose of clearness over that which is used in practice, the actual thickness being as will be described hereafter. The assembled elements have their lateral surfaces enclosed by a wrapper 14 of electrical insulating and electrolyte resisting material, such as a phenol-formaldehyde resin, paraffin-impregnated paper, etc. The wrapper 14 does not cover the ends of the assembly, whereby the ends of the electrodes 10 and 11 and of the silver bromide layer 12 and the separating sheet 13 are exposed. The ends of the electrodes project from one end of the wrapper to provide terminals 15 and 16 which are to be connected to an external circuit.

The cell elements are assembled in the dry condition. Prior to placing the cell in operation by connecting the terminals 15 and 16 to a work circuit, the cell is moistened by dipping it in water. The bibulous separating sheet 13 absorbs the water and becomes moistened, and the cell may immediately thereafter be connected to a work circuit, whereupon current will flow in such circuit.

Ionizable electrolyte compounds are not introduced into the said cell, and the water used for moistening may be ordinary tap water, or distilled water, which contains little or no such ionizable compounds. The silver bromide is substantially insoluble in water, and there are therefore, no ionizable salts or other compounds intentionally added for carrying on the electrolytic action during the initial operation of the cell. It is believed that the presence of electrolyte compounds is not essential for the initiation of cell operation. It is believed that the solution pressure of magnesium in plain water is sufficient to cause some of the magnesium to go into solution as magnesium ions, and that there is also a tendency for silver bromide in water to be reduced to silver, causing bromide ions to go into solution, and that when the electrodes of the cell are connected together through the external circuit so that current can flow, these two tendencies cause a continuing action accompanied by the formation of magnesium and bromide ions, which ions constitute magnesium bromide. The reactions which take place may be expressed by the following equations:

$$Mg \rightarrow Mg^{++} + 2e$$
$$2AgCl + 2e \rightarrow 2Cl^- - 2Ag$$
$$Mg^{++} + 2Cl^- \rightleftharpoons MgCl_2$$

The action proceeds with great rapidity as soon as the external circuit is closed, and the cell develops its full voltage and current delivering powers almost instantly.

A dry cell of the character described possesses a number of valuable properties, chief among which are low internal resistance and complete inactivity during the period of storage before it is placed in use. The anode metal magnesium is highly active, whereby in ordinary cell construction in which substantial quantities of electrolyte salts are incorporated in the making of the cell, there is more local action and anode corrosion during storage and inactivity than there is in the same type of cell employing zinc for the anode metal. In the ordinary cell employing a zinc anode careful precautions must be taken to prevent such local action, and many expedients have been devised for this purpose, and in a cell employing magnesium the problem is greater because of the greater reactivity of this metal. The dry cell which has been described above is completely inactive until it is placed in operation, because moisture and electrolyte compounds are both absent.

The silver bromide layer 12 may be applied to the silver cathode in the form of a plastic paste, made by mixing the silver bromide with water absorbent or water-soluble resins, which may be organic or inorganic in character, such as the polyvinyl alcohols, glue, and alkali metal silicates, or with fillers such as bentonite and finely powdered silica gel. However, it is preferred to form the layer by electrolytic deposition directly upon the surface of the silver cathode. This may be done by immersing the silver cathode and another silver electrode in a dilute aqueous solution of an alkali metal bromide, such as sodium bromide. A solution having a concentration of approximately 10% of sodium bromide is satisfactory. Direct current is passed through the cell at a potential of approximately 2.6 volts and a current density of approximately 0.3 ampere per square inch. The electrode which is to be the cathode of the dry cell is connected as the anode in said electrolytic cell, and silver bromide is plated upon its surface. The coating may be applied to both sides of the electrode in some modifications of the dry cell of the invention, as will be described hereafter. If it is desired to confine the coating to one side of the electrode, two sheets or plates are arranged in contiguous relation, and are separated after deposition is complete. After the desired thickness of coating has been formed, the coated electrode is removed from the bath, washed free of electrolyte salts and dried before being assembled in the dry cell. The electrolytically deposited layer possesses the desirable property that it is uniform in thickness and free of projections, and is dense and compact, thereby minimizing the space occupied by it.

The above description is given as an example of a satisfactory dry cell in accordance with the present invention, and there are various modifications which may be made in its construction. For example, the cathode may be composed of substances other than silver, such as, for example gold, platinum and carbon.

Compounds other than silver bromide may be used as the depolarizer. The other water-insoluble silver halides, that is, silver chloride and silver iodide may be used. These compounds are capable of reacting with hydrogen to form water-soluble, ionizable compounds, and other substantially water insoluble compounds capable to undergoing such reaction may also be used. For example, silver sulfide and other sulfides may be used, which will react with hydrogen to form hydrogen sulfide.

Metals other than magnesium which are electronegative to the cathode metal, may be employed for the anode, such as calcium.

While water is the preferred liquid for moistening the cell, other liquids may also be used. The essential characteristic which the liquid should possess is the ability to carry in ionized condition, magnesium bromide or the corresponding compound formed as a result of the reactions within the cell. Examples of liquids which are satisfactory are mixtures of water with liquids which are miscible therewith, such as ethyl alcohol, ethylene glycol, and sorbitol.

It may be desirable to increase the rate at which the thorough moistening of the bibulous layer 13 takes place, and this may be accomplished by incorporating a small quantity of a wetting agent in the bibulous layer or in the water. Any of the ordinary commercially available wetting agents may be used, such as diamyl sodium sulfosuccinate, sold under the trade-mark "Aerosol AY."

If it is desired to increase the rapidity with which the current reaches its maximum value when the call is initially placed in use, this may be accomplished by incorporating shortly before the cell is placed in use a small amount of active electrolyte compounds, such as hydrochloric acid, hydrobromic acid, sodium bromide and the like in the moistening water. An aqueous solution containing 2.0% by weight of hydrobromic acid is satisfactory. The silver bromide is insoluble in aqueous solutions of the said electrolyte compounds.

The dry cell of the invention may take other forms than that shown in Figs. 1 and 2. The modification shown in Figs. 3 and 4 is adapted for the production of large output current. The cell elements, instead of being flat sheets or plates, are in the form of elongated thin strips rolled together spirally in the form of a cylinder. While the thickness of the metal strips may vary considerably, they are preferably of the thickness of foil, that is, of a thickness less than approximately 0.004 inch. The exterior cell member is the magnesium anode 20 and progressing inwardly therefrom are the bibulous separating sheet 21, the layer of silver bromide 22, the silver cathode 23, a second layer of silver bromide 24 on the opposite side of the silver cathode, and a second bibulous separating sheet 25 similar to sheet 21. The strips are of substantially equal width, and the assembled strips are rolled up spirally as shown in Fig. 3 to form a unit which is generally cylindrical in shape. This unit is enclosed laterally by a cylindrical wrapper 26, which may be composed of metal or of electrical insulating and electrolyte resisting material. The wrapper does not enclose the top and bottom of the unit, whereby the edges of the elements are left exposed and the cell may be moistened readily by dipping in water. The strip of magnesium 20 is formed in such manner as to leave a tab extending laterally from the outer end thereof, which, as shown in Fig. 4, projects upwardly and serves as a terminal 27 of the cell. In the same manner, the inner end of the silver strip 23 is shaped to form a laterally projecting tab, which projects upwardly to form the opposite terminal 28 of the cell. Container 26 is in contact with the anode 20 and if it is composed of metal a suitable terminal may be connected to it to serve in place of terminal 27.

The dry cell of Figs. 3 and 4 functions in the same manner as that of Figs. 1 and 2. In order to render the cell operative, it is dipped in water, whereby the bibulous separating sheets 21 and 25 absorb sufficient water to become moist throughout. The cell is thereupon adapted for delivering electrical energy when a work circuit is connected to terminals 27 and 28. A dry cell of this character has the property of delivering a remarkably large output current for its size. As an example, a dry cell of the construction shown in Figs. 3 and 4 was approximately ¼ inch in diameter and ½ inch in length, and the cell elements were of the following approximate thickness: Anode, 0.002 inch; cathode, 0.0005 inch; silver bromide layers, less than 0.0001 inch; bibulous separating sheets, 0.0012 inch. It is preferred that the anode and cathode be not more than approximately 0.010 inch apart.

This dry cell delivered a current of approximately 15 amperes when connected to an ammeter and lighted a flashlight lamp for five minutes. The open circuit voltage of a cell of this character is approximately 1.8 volts.

The large current which the cell is capable of delivering is due primarily to the relatively low internal resistance of the cell. Such low resistance is due to the close proximity of the anode and cathode to each other, to the large area of the surfaces of these electrodes which are exposed to each other.

The dry cell of Fig. 5 is similar to that of Figs. 3 and 4, but is provided with a complete enclosure for sealing it from the atmosphere. The cell comprises the cylindrical unit 30, similar to the unit of spirally coiled elements shown in Fig. 3, which unit has been moistened with water whereby the sheets of bibulous separating material are moistened and the cell is adapted to deliver energy upon the connection of a work circuit to the terminals 31 and 32, which are similar to the terminals 27 and 28 shown in Fig. 4. The closure for the unit comprises an open-top, cup-shaped cylindrical container 33 composed of electrical insulating and electrolyte resisting material. The unit 30 rests upon the bottom of the container 33 and an air space 34 is provided above the top of the unit. A washer 35 of electrical insulating and electrolyte resisting material fits within the upper portion of the container 33 above the air space 34 and has openings therein adapted to accommodate the terminals 31 and 32 which pass therethrough. A heat-fusible sealing composition, such as pitch or wax, is poured in the fused condition upon the top of the washer 35 to form an air impervious seal 36 at the top of the container and about the terminals 31 and 32. During operation, the air space 34 acts as an expansion space to accommodate the gases which may be formed as a result of the electrolytic action.

A dry cell of the type shown in Fig. 5 remains inactive during periods of storage prior to being placed in operation, and it has been found that it is subject to but slight local action or deterioration. While the cell unit 30 is not dry as in the case of the previously described cell, ionizable compounds are substantially absent from the interelectrode spaces, and this condition is not altered until the external circuit is closed. The sealing member 36 retains the moisture wtihin the cell throughout its useful life. As a result, there is substantially no electrolytic activity, and the cell undergoes but little deterioration during the storage period.

Means may be employed for inhibiting such deterioration as may take place. It has been found that corrosion of the anode during storage of a moistened cell is inhibited by the application of a water-soluble compound containing a $CrO_4$ radical. For example, the anode may be dipped in a dilute aqueous solution of chromic acid or of an alkali metal chromate or dichromate, and then dried. The inhibiting compound may also be dissolved in the water which is used to moisten the cell. Such inhibiting compound exerts a depressing action upon the current output during the service operation of the cell, and may be employed in solution in the water if a smaller current output is desired.

The dry cell of Fig. 6 is similar to that of Fig. 5, but is adapted for being stored in the dry condition until it is desired to moisten it prior to placing it in use. The cell consists of a cup-shaped container 40, similar to container 33 of Fig. 5, and a cylindrical cell unit 41 similar to the unit shown in Figs. 3 and 4 disposed within the container 40, the unit having terminals 42 and 43 projecting upwardly therefrom and being exposed for ready connection to an external circuit. A washer 44 fits within the upper portion of the container 40 in spaced relation to dry cell unit 41, to provide an expansion space 45. Washer 44 has an opening 46 therein and a threaded seat member 47 is mounted in the opening and is adapted to be closed by a threaded plug 48. A fusible seal 49 closes the open top of the container 40. In this construction, the dry cell unit is kept in the dry condition until just prior to the time it is desired to place it in operation, and then water or other suitable liquid, as described above, is introduced into the opening 46 in the cell top closure to moisten the cell, after which the plug 48 is threaded into the seat member 47 to form a vapor proof seal.

The dry cell of this invention is adapted for the delivery of a large output current, as has been described heretofore, and the available energy of the cell may be, therefore, consumed at a relatively rapid rate. In some instances, this energy will be consumed in a single continuous operation. In other instances, however, each service operation will be of relatively short duration, and in such cases the cell may be placed in operation repeatedly until it has reached the exhausted condition. The constructions of Figs. 5 and 6 are the forms adapted for operation of the latter character, because the moisture required for operation is preserved within the sealed container. The constructions of Figs. 1 to 4 are also adapted for this service. In the latter constructions, however, the moisture may be lost by evaporation between service operations, in which case the cell must be moistened each time before it is placed in use.

A further modification of the invention is illustrated in Fig. 7. In this modification the spirally coiled cell unit 50, similar to the coiled unit shown in Fig. 3, is contained in a sealed glass container 51. The terminals 52 and 53, which are similar to the terminals 27 and 28 shown in Fig. 4, extend from unit 50 and are electrically connected, as by soldering, to wire terminals 54 and 55 which extend through the wall of the container 51 and are sealed to the said wall in a manner well known in art. The container 51 is evacuated prior to sealing and is then sealed in such manner as to form a tip 56 at the end thereof opposite the terminals. The cell unit 50 is maintained in the dry condition until it is desired to place it in service, when the container is submerged in water and the tip 56 broken in such manner as to cause water to enter and moisten the cell unit. In this form of the construction the thorough moistening of the bibulous layers between the electrodes takes place rapidly.

In Fig. 8 is illustrated a multiple cell battery, made up of a plurality of cells similar to that illustrated in Figs. 1 and 2. The battery comprises an open-top container 60 composed of electrical insulating and electrolyte resisting material, within which are contained, under pressure and in juxtaposed relation, a series of cell elements. The first element, starting at the left side of Fig. 8, is the silver cathode 61 which has a layer of silver bromide 62 upon the surface thereof remote from the adjacent container wall. Proceeding inwardly from the layer 62 are a thin sheet of bibulous separating material 63 and a magnesium anode 64.

These elements compose a single dry cell similar to that shown in Figs. 1 and 2. The lower portion of the magnesium anode 64 is electrically joined, as by soldering, to the adjacent portion of the silver cathode 65 of the next succeeding cell, the remainder of the surfaces of the two electrodes being separated by means of a thin electrical insulating and electrolyte resisting material 66, which may be composed of a thin film material of a composition of rubber and paraffin, sold under the trade-mark "Parafilm." Other materials may be used also, such as phenolformaldehyde resins, polymerized vinyl chloride resins, film rubber, and others which are non-conductors of electricity and are chemically resistant to the electrolyte of the cell. Proceeding from the silver cathode 65 of the second cell the same series of elements is found as in the first cell, these elements being, in order, the layer of silver bromide, the sheet of bibulous material and the magnesium anode, which is again electrically connected at its lower portion to the silver cathode of the third cell, and the series of cell elements is continued in the same manner until the battery contains the desired number of cells. To simplify the description, a battery of three cells is shown, but any number of cells may be employed as is desired. In a multiple-cell battery of this construction employing electrodes of foil-like thickness, as many as 25 cells can be accommodated in a battery container which has an inside length of approximately ⅝ of an inch. The end electrodes are extended upwardly beyond the top of the container 60 to form the terminals 68 and 69 of the battery. The first of these electrodes is the silver cathode 61 of the first cell and the second is the magnesium anode 67 of the last cell. If it is desired to make available one or more intermediate potentials, this may be done by extending any desired intermediate cell electrode above the top of container 60 so that it is adapted for connection to the external circuit. When it is desired to render the battery operative, it is moistened in the manner described heretofore in connection with the cells of Figs. 1 to 7, and the battery terminals are then connected to the external circuit.

I claim:

1. A primary cell, comprising a cathode having a high positive value in the electrochemical series and being from the group consisting of silver, gold, platinum and carbon, a body of a substantially water-insoluble depolarizing material capable of reacting with hydrogen to form a water-ionizable compound adjacent said cathode, an anode of a metal having a high negative value in the electrochemical series and being from the group consisting of magnesium and calcium in adjacent spaced relation to said depolarizing body, a body of bibulous electrical insulating material between said depolarizing body and said anode, the interelectrode space occupied by said depolarizing body and said bibulous body being substantially free of ionically conductive electrolyte compounds.

2. A primary cell in accordance with claim 1 in which the cathode consists of silver.

3. A primary cell in accordance with claim 1 in which the anode consists of magnesium.

4. A primary cell in accordance with claim 1 in which the depolarizing material is from the group consisting of silver sulfide and the substantially water-insoluble silver halides.

5. A primary cell comprising cell elements arranged in mutually contiguous relation in the following order; a silver cathode, a body of depolarizing material composed of a substantially water-insoluble silver halide, a body of bibulous, non-conductive material, and a magnesium anode, the interelectrode space occupied by said depolarizing material and bibulous body being substantially free of ionically conductive electrolyte compounds.

6. A primary cell in accordance with claim 5 in which the depolarizing material is silver bromide.

7. A primary cell in accordance with claim 5 which is in a substantially dry condition and is adapted to be rendered operative by moistening said bibulous layer with water only.

8. A primary cell in accordance with claim 5 which is moistened with a liquid capable of carrying magnesium bromide in ionized condition.

9. A primary cell in accordance with claim 5 which has been moistened with water only.

10. A primary cell in accordance with claim 5 in which the silver halide has been formed by the electrolytic deposition thereof on the surface of the silver cathode.

11. A primary cell in accordance with claim 5 in which the cell elements are subtantially planar.

12. A primary cell comprising cell elements arranged in mutually contiguous relation in the following order; a cathode, a body of substantially water-insoluble depolarizing material capable of reacting with hydrogen to form a water-ionizable compound, a body of bibulous electrical insulating material, and a magnesium anode, the interelectrode space occupied by said depolarizing material and bibulous body being substantially free of ionically conductive electrolyte compounds.

13. A primary cell comprising juxtaposed sheet-form cell elements arranged in mutually contiguous relation in the following order and rolled together spirally into the form of a cylinder; a cathode having a high positive value in the electrochemical series and being from the group consisting of silver, gold, platinum and carbon, a layer of substantially water-insoluble depolarizing material capable of reacting with hydrogen to form a water-ionizable compound, a layer of bibulous electrical insulating material, an anode of a metal having a high negative value in the electrochemical series and being from the group consisting of magnesium and calcium, and a sheet of electrical insulating material, the interelectrode space occupied by said depolarizing material and bibulous layer being substantially free of ionically conductive electrolyte compounds.

14. A primary cell comprising juxtaposed sheet-form cell elements arranged in mutually contiguous relation in the following order and rolled together spirally into the form of a cylinder; a silver cathode, a depolarizing material composed of a substantially water-insoluble silver halide, a layer of bibulous electrical insulating material, a magnesium anode, and a sheet of electrical insulating material, the interelectrode space occupied by said depolarizing material and said bibulous sheet being substantially free of ionically conductive electrolyte compounds.

15. A primary cell comprising juxtaposed sheet-form cell elements arranged in mutually contiguous relation in the following order and rolled together spirally into the form of a cylinder; a magnesium anode, a layer of bibulous electrical insulating material, a layer of depolarizing material composed of a substantially water-insoluble silver halide, a silver cathode, a layer of depolarizing material composed of a water-insoluble silver halide, and a layer of bibulous electrical insulating material, the interelectrode spaces occupied by said layers of depolarizing material and bibulous sheets being substantially free of ionically conductive electrolyte compounds.

16. A primary battery comprising a plurality of cells electrically connected together, said cells each comprising cell elements arranged in mutually contiguous relation in the following order; an anode of a metal having a high negative value in the electrochemical series and being from the group consisting of magnesium and calcium, a body of bibulous electrical insulating material, a body of substantially water-insoluble depolarizing material capable of reacting with hydrogen to form a water-ionizable compound, and a cathode having a high positive value in the electrochemical series and being from the group consisting of silver, gold, platinum and carbon, the interelectrode space occupied by said depolarizing material and bibulous body being substantially free of ionically conductive electrolyte compounds.

17. A primary battery comprising a plurality of cells electrically connected together, each said cell comprising cell elements arranged in mutually contiguous relation in the following order; a magnesium anode, a body of bibulous electrical insulating material, a body of depolarizign material composed of a substantially water-insoluble silver halide, and a silver cathode, said cells being substantially free of ionically conductive electrolyte compounds in the interelectrode spaces thereof occupied by said depolarizing material and said bibulous body.

18. A primary battery comprising a plurality of cells, each cell comprising juxtaposed, substantially planar, sheet-form cell elements arranged in mutually contiguous relation in the following order; a magnesium anode, a layer of bibulous electrical insulating material, a layer of depolarizing material composed of a substantially water-insoluble silver halide, and a silver cathode, said cells being arranged with the cathode of one cell in contact with the anode of the adjacent cell, the interelectrode space of each cell being substantially free of ionically conductive electrolyte compounds.

19. A primary battery comprising a plurality of cells, each cell comprising juxtaposed, substantially planar, sheet-form cell elements arranged in mutually contiguous relation in the following order; a magnesium anode, a layer of bibulous electrical insulating material, a layer of depolarizing material composed of a substantially water-insoluble silver halide, and a silver cathode, said cells being arranged with a portion of the area of the cathode of one cell in contact with the anode of the adjacent cell, the remainder of the areas of said adjacent anodes and cathodes being separated by a sheet of electrical insulating and electrolyte repellent material, the interelectrode space of each cell being substantially free of ionically conductive electrolyte compounds.

20. A primary battery comprising one or more cells electrically connected together, each cell comprising cell elements arranged in mutually contiguous relation in the following order; a magnesium anode, a body of bibulous electrical insulating material, a body of depolarizing material composed of a substantially water-insoluble silver halide, and a silver cathode, the interelectrode space of each said cell which is occupied by the depolarizing material and bibulous body being substantially free of ionically conductive electrolyte compounds, and a frangible air-impervious envelope enclosing said battery, said battery having a pair of terminals extending through the wall of said envelope, said battery being in substantially dry condition and being adapted to be rendered operative by breaking said frangible envelope and moistening said bibulous body with water.

21. A primary cell comprising juxtaposed thin sheet-form cell elements arranged in mutually contiguous relation in the following order; a cathode having a high positive value in the electrochemical series and being from the group consisting of silver, gold, platinum and carbon, a layer of substantially water-insoluble depolarizing material capable of reacting with hydrogen to form a water-ionizable compound, a layer of bibulous electrical insulating material, and an anode of a metal having a high negative value in the electrochemical series and being from the group consisting of magnesium and calcium, the interelectrode space occupied by said depolarizing material and bibulous sheet being substantially free of ionically conductive electrolyte compounds.

22. A primary cell, comprising a cathode having a high positive value in the electrochemical series and being from the group consisting of silver, gold, platinum and carbon, a body of substantially water insoluble depolarizing material capable of reacting with hydrogen to form a water-ionizable compound adjacent said cathode, an anode of a metal having a high negative value in the electrochemical series and being from the group consisting of magnesium and calcium in adjacent spaced relation to said depolarizing body, a body of bibulous electrical insulating material between said depolarizing body and said anode, and a wetting agent carried by said bibulous body, the interelectrode space occupied by said depolarizing body and said bibulous body being substantially free of ionically conductive electrolyte compounds.

HERBERT E. LAWSON.

REFERENCES CITED

The following references are of record in the file of this patent:

UNITED STATES PATENTS

| Number | Name | Date |
|---|---|---|
| 293,563 | Clarke et al. | Feb. 12, 1884 |
| 405,196 | Barrett | June 11, 1889 |
| 1,393,739 | Benner et al. | Oct. 18, 1921 |
| 1,401,671 | Chubb | Dec. 27, 1921 |
| 1,920,151 | Ruben | July 25, 1933 |
| 2,040,255 | Gordon | May 12, 1936 |
| 2,078,143 | Jumau | Apr. 20, 1937 |
| 2,272,969 | French | Feb. 10, 1942 |
| 2,322,210 | Adams | June 22, 1943 |
| 303,237 | Skrinanow | Aug. 5, 1884 |
| 1,148,152 | De Mello | July 27, 1915 |
| 1,662,866 | Salazar | Mar. 20, 1928 |
| 2,257,129 | Ruben | Sept. 30, 1941 |

FOREIGN PATENTS

| Number | Country | Date |
|---|---|---|
| 8,560 | Australia | 1932 |
| 423,301 | Great Britain | Jan. 24, 1935 |

OTHER REFERENCES

Vinal, G. W., "Storage Batteries," 2nd ed. (1930), page 145.

Smith, J. W., Light Metals, June 1938, pages 172–174.

Certificate of Correction

Patent No. 2,428,850.

October 14, 1947.

HERBERT E. LAWSON

It is hereby certified that errors appear in the printed specification of the above numbered patent requiring correction as follows: Column 3, line 10, in the equation, for "2Cl⁻2Ag" read $2Cl^-+2Ag$; column 4, line 12, for the word "to" read *of*; line 41, for "call" read *cell*; column 6, line 8, for "wtihin" read *within*; column 9, line 62, claim 17, for "depolarizign" read *depolarizing*; and that the said Letters Patent should be read with these corrections therein that the same may conform to the record of the case in the Patent Office.

Signed and sealed this 27th day of January, A. D. 1948.

[SEAL]

THOMAS F. MURPHY,
*Assistant Commissioner of Patents.*